US006942435B2

(12) United States Patent
Schaible et al.

(10) Patent No.: US 6,942,435 B2
(45) Date of Patent: Sep. 13, 2005

(54) MACHINE TOOL

(75) Inventors: Hermann Schaible, Biberist (CH); Robert Simm, Oekingen (CH); Reto Michel, Günsberg (CH)

(73) Assignee: Robert Bosch GmbH, Stuttgart (DE)

(*) Notice: Subject to any disclaimer, the term of this patent is extended or adjusted under 35 U.S.C. 154(b) by 510 days.

(21) Appl. No.: 10/204,028

(22) PCT Filed: Jan. 30, 2001

(86) PCT No.: PCT/EP01/00956

§ 371 (c)(1), (2), (4) Date: Oct. 11, 2002

(87) PCT Pub. No.: WO01/60570

PCT Pub. Date: Aug. 23, 2001

(65) Prior Publication Data

US 2003/0079562 A1 May 1, 2003

(30) Foreign Application Priority Data

Feb. 19, 2000 (DE) ........................................ 100 07 665

(51) Int. Cl.[7] ................................................ B23B 45/02

(52) U.S. Cl. ......................... 408/124; 173/216; 74/371; 74/473.36

(58) Field of Search ......................... 74/473.36, 473.37, 74/335, 371, 372, 370; 408/124; 173/48, 216, 178

(56) References Cited

U.S. PATENT DOCUMENTS

| | | | | | |
|---|---|---|---|---|---|
| 3,934,688 A | | 1/1976 | Sides | | |
| 4,493,223 A | * | 1/1985 | Kishi et al. | .................... | 74/371 |
| 4,710,071 A | * | 12/1987 | Koehler et al. | ............. | 408/133 |
| 5,992,257 A | | 11/1999 | Nemetz | | |
| 6,192,996 B1 | * | 2/2001 | Sakaguchi et al. | ............ | 173/48 |
| 6,619,149 B2 | * | 9/2003 | Funfer | ......................... | 74/329 |

FOREIGN PATENT DOCUMENTS

| | | | | |
|---|---|---|---|---|
| DE | 2438783 | * | 3/1976 | ........... B23B/45/02 |
| DE | 3526150 | * | 2/1986 | ........... B23B/45/02 |
| DE | 3538121 | * | 4/1987 | ........... B23B/45/02 |
| DE | 3540605 | * | 5/1987 | ........... B23B/45/02 |
| DE | 44 41 793 | | 5/1996 | |
| EP | 0 463 416 | | 6/1991 | |
| EP | 0 437 716 | | 7/1991 | |
| GB | 752251 | * | 7/1956 | ................. 408/124 |
| GB | 2073062 | * | 10/1981 | ................. 408/124 |
| GB | 2157611 | * | 10/1985 | ........... B25D/17/00 |

* cited by examiner

*Primary Examiner*—Daniel W. Howell
(74) *Attorney, Agent, or Firm*—Kenyon & Kenyon

(57) ABSTRACT

A machine tool, particularly a hand machine tool, including an indexing mechanism which is switchable by an actuating element via at least one coupling element, and including at least one spring element arranged in the flux of force between the actuating element and the coupling element. The spring element in the flux of force from the actuating element in the direction of the coupling element is fixedly connected to a first component in at least two actuating directions, and in the opposite direction of the flux of force, is fixedly connected to a second component at least in the two actuating directions.

12 Claims, 9 Drawing Sheets

MACHINE TOOL

FIELD OF THE INVENTION

The present invention relates to a machine tool particularly a hand machine tool, including an indexing mechanism which is switchable by an actuating element by manner of at least one coupling element, and including at least one spring element disposed in the flux of force between the actuating element and the coupling element.

BACKGROUND INFORMATION

German Published Patent No. 44 41 793 discusses a hand machine tool including an indexing mechanism which is switchable by an actuating element. The actuating element is rotationally mounted in a housing of the hand machine tool, and includes a switch eccentric which engages, with play, in a ring gap of a switching element of the indexing mechanism. The switch eccentric is flexibly compliant, so that the actuating element may be set in a desired turning position even when toothings of the indexing mechanism stand tooth upon tooth.

European Patent No. 0 437 716 discusses a hand machine tool including a switching device which is switchable by an actuating element via at least one contact member. A spring element is arranged in the flux of force between the actuating element and the contact member, the spring element in the flux of force from the actuating element in the direction of the contact member is fixedly connected to a first component in two actuating directions, and in the opposite direction of the flux of force, is fixedly connected to a second component in both actuating directions. The component is formed by an eccentric pin integrally molded onto the actuating element. However, the spring element is elastically deformable by the component in only one first actuating direction, and specifically when it is moved in the direction of a free limb of the spring element formed as a torsion spring. In a second actuating direction, the component acts on a second limb of the spring element formed as a torsion spring; however, the limb is fixedly held at two points and is therefore not or is only insignificantly elastically deformable.

European Patent No. 0 463 416 discusses a hammer drill including an indexing mechanism. The indexing mechanism possesses a lay shaft which includes two gear wheels of different diameters fixedly joined to it. The gear wheels are in constant engagement with two gear wheels mounted in a rotatable and axially fixed manner on a spindle. Between the gear wheels, a coupling ring is mounted on the spindle in a rotatably fixed and axially displaceable manner, the coupling ring including one coupling toothing facing each of the gear wheels. The coupling toothings may be forced into engagement with counter-coupling toothings integrally molded onto the gear wheels in the axial direction.

A two-part, two-limbed shift fork engages with the coupling ring. The shift fork grips with its first limb axially in the direction of a tool holder behind the coupling ring and is pressed with an abutment surface, fixedly joined to the first limb, in an axial direction facing away from the tool holder by manner of a first compression spring against an annularly-closed cam of a control lever, the cam is formed by an annular groove. A second limb of the shift fork is arranged in the axial direction with respect to the tool holder in front of the coupling ring. The second limb is mounted so that it is axially displaceable with respect to the first limb and is stressed by a second compression spring in the direction of the coupling ring. The second compression spring, by manner of the second limb, presses the coupling ring in the direction of the tool holder against the first limb.

The control lever includes a rotary knob, projecting from a housing, which is mounted in a manner which may allow rotation about an axis running perpendicular to the spindle. Using the rotary knob, the coupling ring may be switched by manner of the cam, the shift fork and its limbs.

If the coupling ring is to be switched in the direction of the tool holder, and coupling teeth of the coupling ring meet coupling teeth of the gear wheel facing the tool holder, then the second limb of the shift fork is moved against the second compression spring. If the coupling teeth of the gear wheel subsequently come to lie above tooth spaces of the coupling ring, for example, upon actuation of the hammer drill, then the coupling ring is switched by manner of the second compression spring.

If the coupling ring is to be switched in the direction facing away from the tool holder, and the coupling teeth of the coupling ring meet coupling teeth of the gear wheel facing away from the tool holder, then the cam of the control lever lifts off from the abutment surface of the shift fork. When coupling teeth of the gear wheel subsequently come to lie above tooth spaces of the coupling ring, the coupling ring is switched by the first compression spring.

SUMMARY OF THE INVENTION

The present invention relates to a machine tool, particularly a hand machine tool, including an indexing mechanism which is switchable by an actuating element by manner of at least one coupling element, and including at least one spring element disposed in the flux of force between the actuating element and the coupling element.

It is described that, in the flux of force from the actuating element in the direction of the coupling element, the spring element be fixedly joined to a first component in at least two actuating directions, and in the opposite direction of the flux of force, be fixedly joined to a second component in at least the two actuating directions. The spring element may be braced in both actuating directions; and using a compact and light construction, few components, particularly only one spring element and one one-piece switching element, e.g. a one-piece shift fork, at least two indexing positions of the indexing mechanism in both actuating directions may be preselected, particularly during standstill of the machine tool, when teeth of the coupling element meet teeth of a counter-toothing. When tooth spaces of the counter-toothing subsequently come to lie above the teeth of the coupling element, for example, when the machine tool is switched on, the preselected indexing position is switched by the spring element. The spring element is configured in one piece; however, a multipart configuration may also be used. The actuating element, i.e. the second component, may be retained in the indexing positions by self-locking or using a detent device.

The spring element may be integrally molded in one piece on the first and/or the second component. However, if the spring element and the first component and/or the second component are formed by separate components, the spring element may be matched by its form, and particularly by the material, specifically to its function and loads resulting therefrom. The spring element may be produced from a plastic; however, the spring element is particularly produced from a spring steel. Yield and fatigue of the material of the spring element may be avoided, even given long service life under tension.

If the first and/or the second component are interconnected with the spring element via at least one integrally molded form-locking element in at least the two actuating directions, additional mounting parts and expenditure for assembly may be reduced.

The spring element may be disposed between different components, such as between the coupling element and a shift fork and between the actuating element and a gear wheel or cam driven by the actuating element. However, the spring element may be arranged particularly simply from the standpoint of configuration, and with few additional components, between a shift fork and a second component driven by the actuating element. The shift fork may be configured in one piece with the coupling element, or may be formed by a component separate from the coupling element, which means the coupling element may be formed from a material capable of being highly loaded, and the shift fork may be formed from a light and cost-effective material suitable for the loads. Furthermore, a shift fork separate from the coupling element permits a simple configuration and easy assembly.

If the second component is connected to a gear rack, or is configured in one piece with a gear rack, the actuating element may be implemented as a rotary knob; and furthermore, with a gear wheel and a gear rack, a form-locking connection may be easily achieved from the standpoint of configuration in both actuating directions without additional components. However, the actuating element may also act on the shift fork or on the coupling element by manner of one or more cams via the spring element, or may also be implemented as a slider. Furthermore, in another exemplary embodiment of the present invention, it is described that the gear rack and the actuating element are interconnected via at least one integrally molded form-locking element. Additional mounting parts may be dispensed with, and in particular, the gear rack may be secured by the actuating element, and the actuating element may be secured by the gear rack to a housing part.

The spring element may have various types of construction. A flexure rod permits a particularly light, compact and inexpensive construction. On the other hand, with a torsion spring, a large, deformable material volume may be achieved by manner of windings, and a precisely defined spring tension may easily be attained with the torsion spring. If the torsion spring engages with one component using two limbs and is supported on the other component on a form-locking element formed as a pin, this results in savings of components and expenditure for assembly.

The configuration approach of the present invention may be used for various machine tools and due to a compact and light construction, may be used particularly for hand machine tools such as drills or impact drilling machines, hammer drills or chisel hammers, angle sanders, screwdrivers, saws, metal-cutting machines, etc.

Further applications come to light from the following description of the drawings. Exemplary embodiments of the present invention are shown in the drawing. The drawings and the specification contain numerous features in combination.

DETAILED DESCRIPTION

Figure 1:
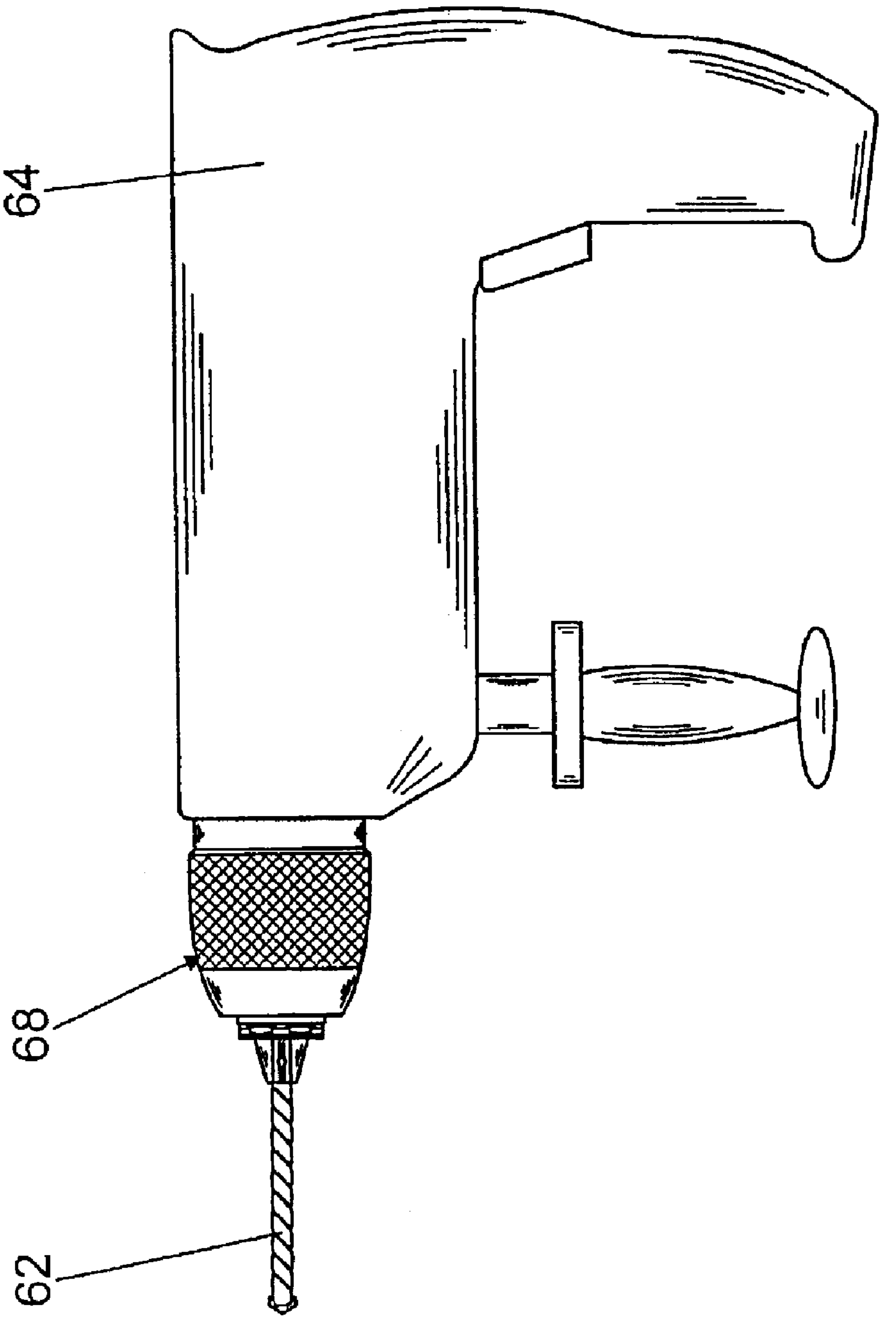
FIG. 1 shows a schematically represented impact drilling machine.
Figure 2:
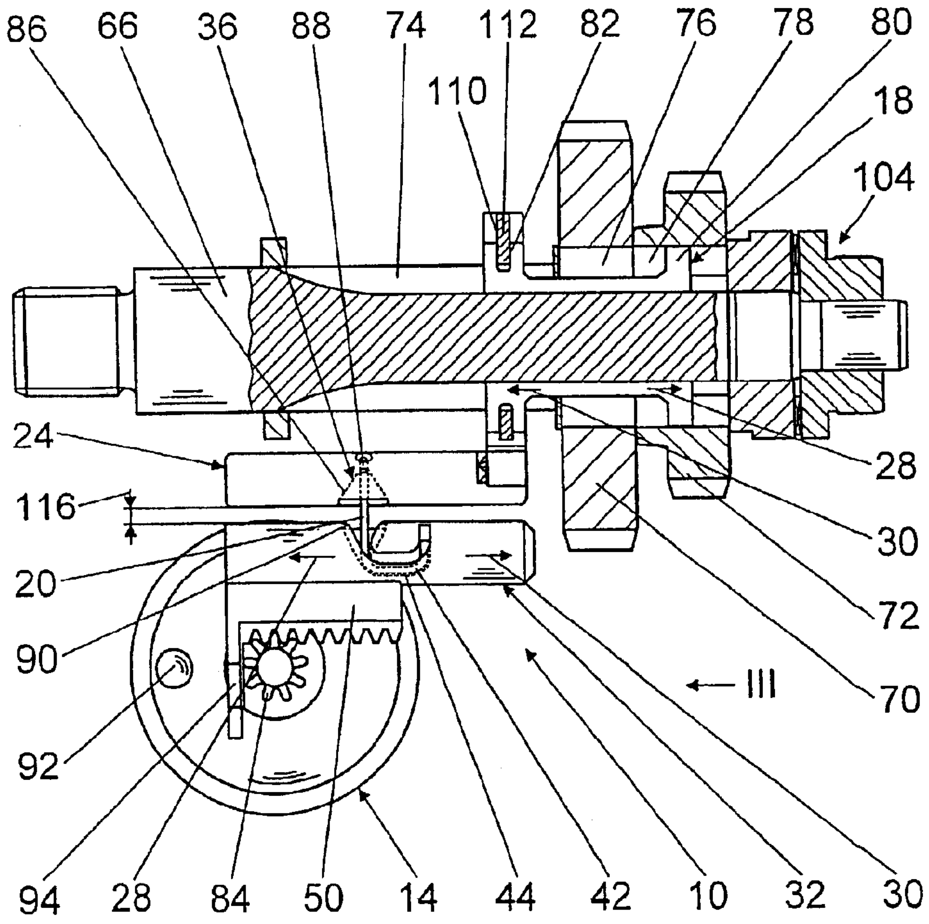
FIG. 2 shows a segment of an indexing mechanism of the impact drilling machine from FIG. 1.

FIG. 1 shows an impact drilling machine including an electric motor (not shown) mounted in a housing 64. A drill bit 62 inserted into a drill head 68 is able to be driven by the electric motor via an indexing mechanism 10, via a drill spindle 66 and via drill head 68 screwed onto drill spindle 66 (FIGS. 1 and 2). To generate axial pulses on drill spindle 66, an index striking mechanism 104 is disposed on the side opposite drill head 68.

Indexing mechanism 10 includes two side-by-side, movable gears 70, 72, rotationally mounted and axially fixed in position on drill spindle 66, which mate with fixed gears (not shown) supported on a countershaft. Radially with respect to drill spindle 66, movable gears 70, 72 each include a coupling toothing 76, 78, via which movable gears 70, 72 are able to be coupled to drill spindle 66 by manner of a metal coupling 18 that is supported in a rotationally fixed manner in a groove 74 of drill spindle 66 and is displaceable in two axial actuating directions 28, 30.

Figure 3:
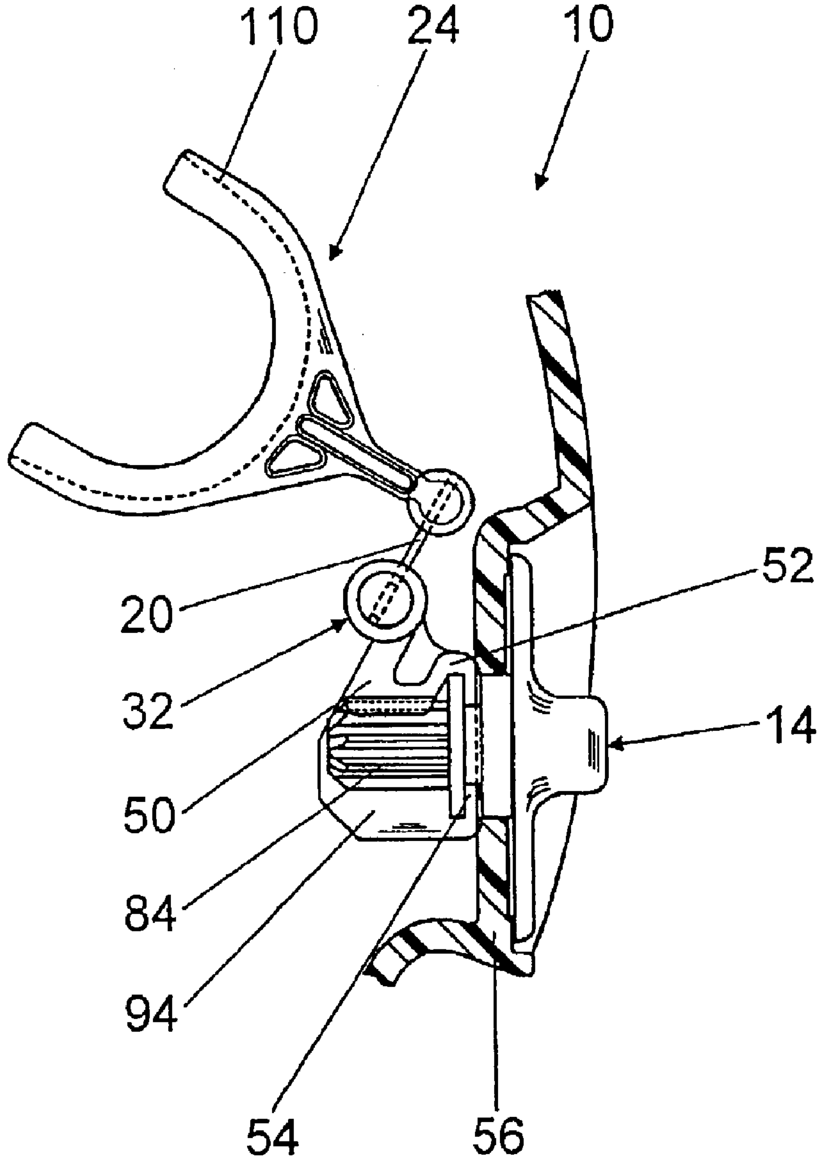
FIG. 3 shows a view in direction III in FIG. 2 in the mounted state in a housing.

Coupling 18 is able to be guided with a coupling toothing 80 radially between movable gears 70, 72 and drill spindle 66, and in this context, is connectible with form locking by coupling toothing 80 to coupling toothings 76, 78 of movable gears 70, 72. On a side of coupling 18 opposite coupling toothing 80, disposed in a circumferential groove 82 is a ring 112 with which a one-part, plastic shift fork 24 including an integrally molded groove 110 engages with form locking in actuating directions 28, 30 (FIGS. 2 and 3).

Indexing mechanism 10 includes a plastic actuating element 14, formed as a rotary knob, on which a gear wheel 84 is integrally molded. Gear wheel 84 mates with a gear rack 50, on which a cylindrical component 32 is integrally molded in one piece, that is shiftable by actuating element 14 via gear wheel 84 and gear rack 50 axially in actuating directions 28, 30.

Component 32 is connected to shift fork 24 by manner of a spring-steel spring element 20, formed by a separate torsion bar, in the flux of force from actuating element 14 to coupling 18. Spring element 20 grabs into a form-locking element 36 formed as a recess integrally molded onto shift fork 24. To attain a large, deformable length of spring element 20, in spite of a small distance 116 between component 32 and shift fork 24, and to avoid shear stress of spring element 20, spring element 20 is guided in a first region 86 of the recess pointing toward component 32 in a manner that it is movable in actuating directions 28, 30. Region 86 tapers in the direction facing away from component 32 and leads into a bore hole 88, in which spring element 20 is connected with form locking to shift fork 24 in actuating directions 28, 30.

Spring element 20, using an integrally molded, form-locking element 42 formed as a hook-like part, locks into component 32 in a correspondingly formed, form-locking element 44 configured as a recess. Spring element 20, with its hook-like part in the recess, is connected to component 32 with form locking in actuating directions 28, 30. To achieve a large, deformable length of spring element 20, in spite of a small distance 116 between component 32 and shift fork 24, and to avoid a shear stress, spring element 20 is guided in the recess of component 32 in a region 90 between two inclined surfaces that points toward shift fork 24, in a manner that it is movable in actuating directions 28, 30. Moreover, the hook-like part of spring element 20 may also partially deform when spring element 20 deforms, leading thereby to a large, deformable spring volume.

Figure 4:
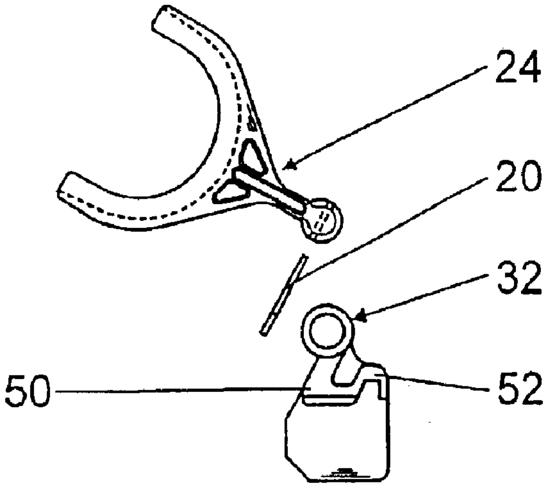
FIG. 4 shows a shift fork in the assembly with a torsion bar and a gear rack.
Figure 5:
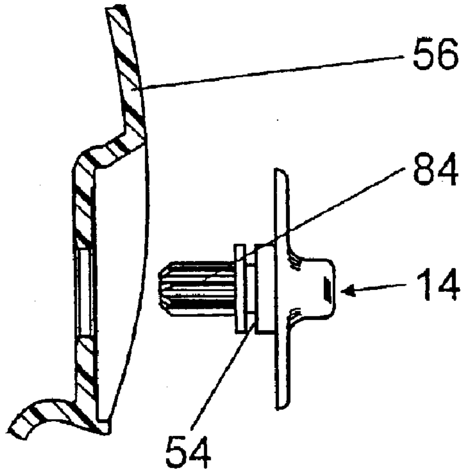
FIG. 5 shows an actuating element in the assembly in a housing.
Figure 6:
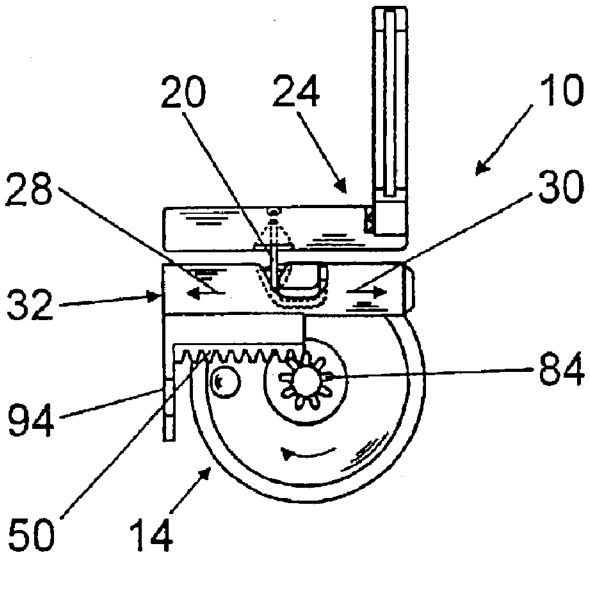
FIG. 6 shows the gear rack from FIG. 4 in the connection with the actuating element from FIG. 5.

During installation, spring element 20 is inserted with the hook-like part into the recess of component 32 (FIG. 4). Shift fork 24 is subsequently slipped onto spring element 20. Actuating element 14 is pushed with gear wheel 84 through an opening of a housing part 56 of the impact drilling machine (FIG. 5). Gear rack 50, preassembled with spring element 20 and shift fork 24, is subsequently inserted into housing part 56, and gear rack 50 is twisted laterally in actuating direction 30 onto gear wheel 84 (FIG. 6). In so doing, a form-locking element 52, formed as a hook on gear rack 50, grabs into a form-locking element 54 of actuating element 14 formed as a turned recess. Gear rack 50 and actuating element 14 are interconnected via form-locking elements 52, 54 (FIG. 3). Moreover, gear rack 50 is secured by actuating element 14, and actuating element 14 is secured by gear rack 50 to housing part 56. Additional mounting parts are dispensed with.

Figure 7:
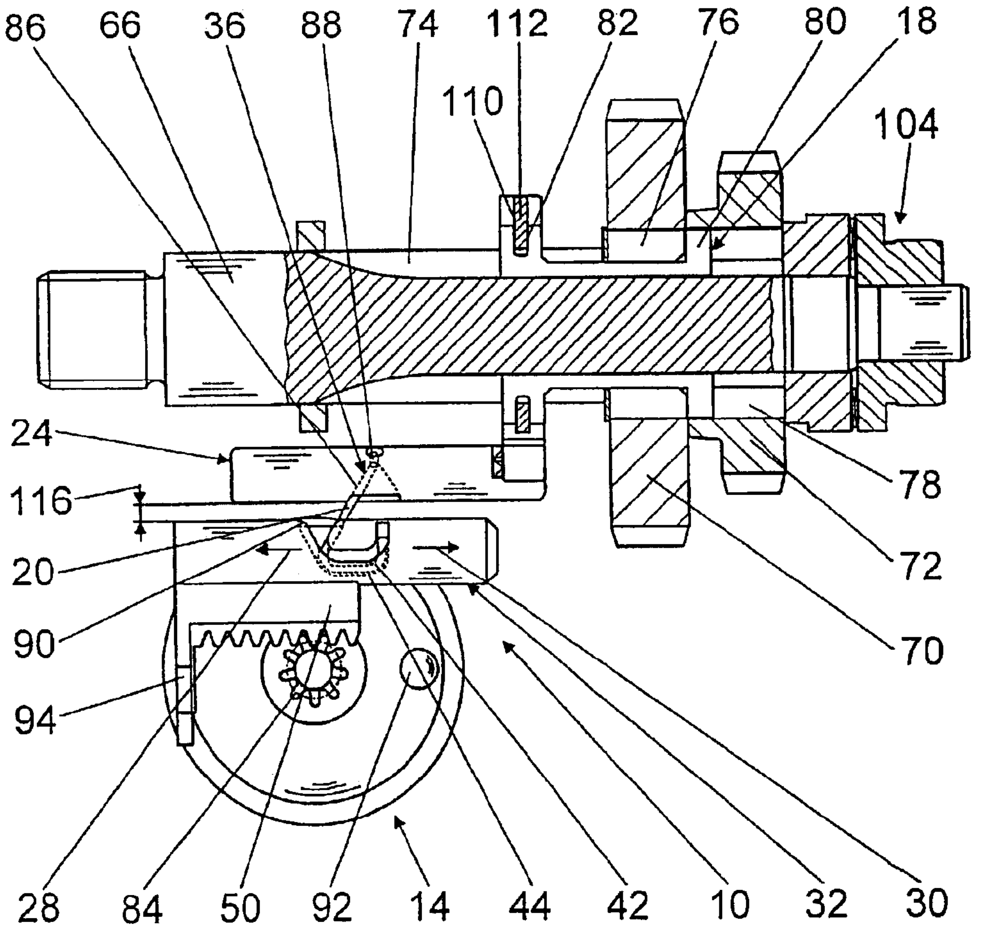
FIG. 7 shows the indexing mechanism from FIG. 2 in a preselected position.

Spring element 20 may be braced in both actuating directions 28, 30; and in both actuating directions 28, 30, particularly when the electric motor is at standstill, given an overlapping of coupling teeth of coupling toothing 80 of coupling 18 and of coupling teeth of coupling toothing 76 and 78 of movable gear 70 and 72, respectively, an indexing position of indexing mechanism 10 may be preselected. FIG. 7 shows indexing mechanism 10 in a preselected position. Component 32 is moved in actuating direction 28 relative to shift fork 24, and spring element 20 is prestressed. To prevent actuating element 14 from turning back out of its preselected positions or out of its indexing positions due to the tensional force of spring element 20, it is fixed in its indexing positions by a detent pin 92 which engages in openings (not shown) in housing part 56 in the indexing positions.

Figure 8:
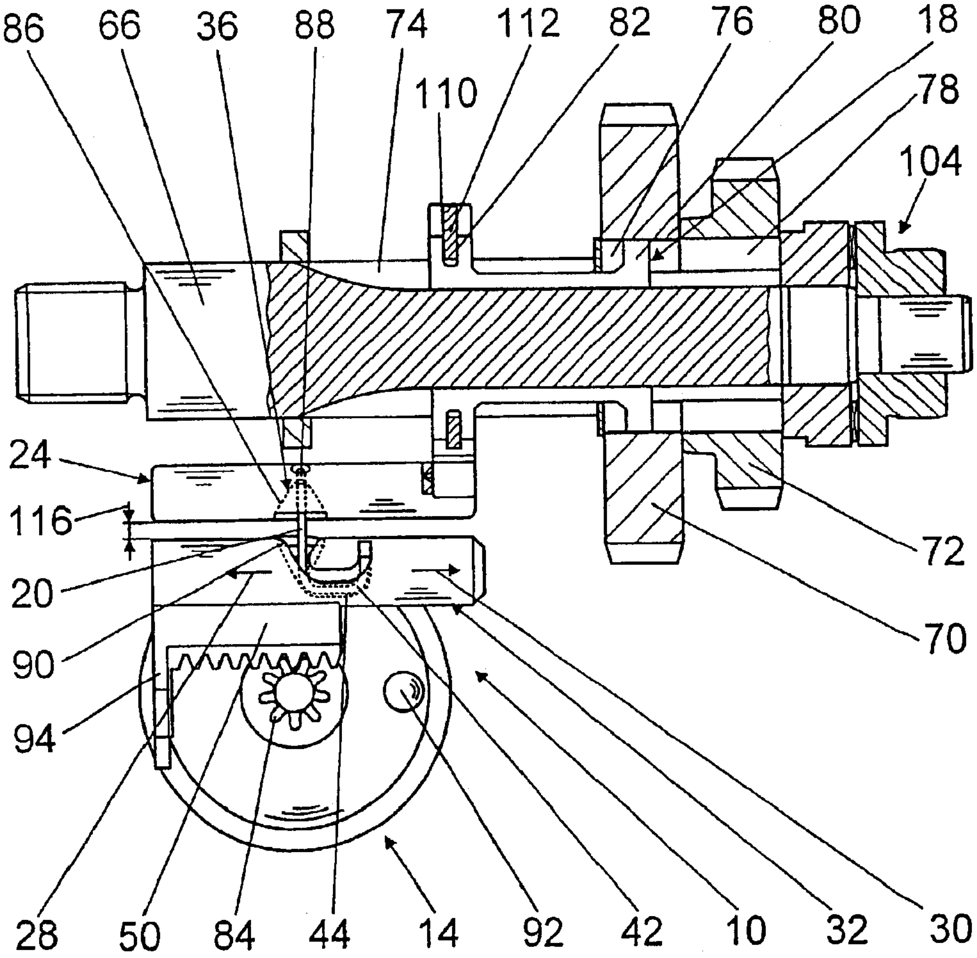
FIG. 8 shows the indexing mechanism from FIG. 7 after an effected switching operation.

When the electric motor of the impact drilling machine is switched on, and a tooth space of coupling toothing 80 of coupling 18 comes to lie in actuating direction 28 above a coupling tooth of coupling toothing 76 of movable gear 70, coupling 18 is switched by spring element 20, and movable gear 70 is connected in a rotationally fixed manner to drill spindle 66 by manner of its coupling toothing 76 and via coupling toothing 80 of coupling 18 (FIG. 8). Drill spindle 66 is subsequently driven by the electric motor with a transmission ratio assigned to switched movable gear 70.

To prevent actuating element 14 from being able to turn beyond the indexing position, gear rack 50 is limited in its movement in actuating direction 28 by a limit stop 94 integrally molded on gear rack 50, and by a limit stop (not shown) in actuating direction 30.

Figure 9:
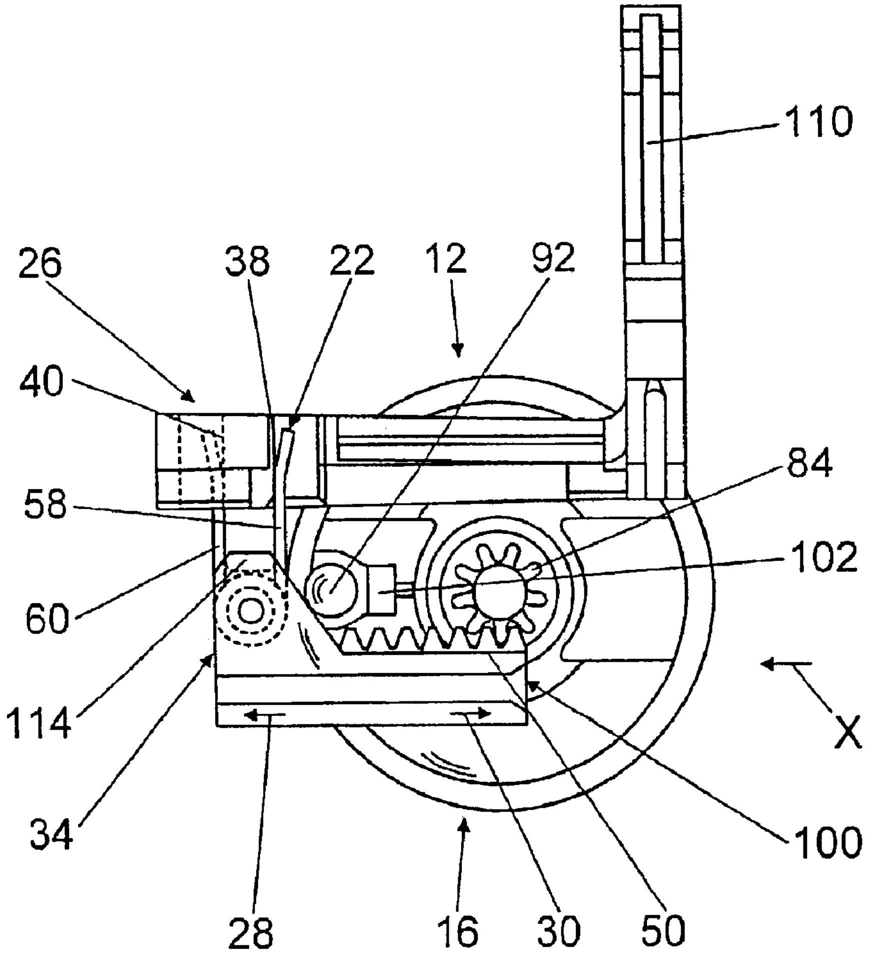
FIG. 9 shows a segment of a variant to FIG. 2.
Figure 10:
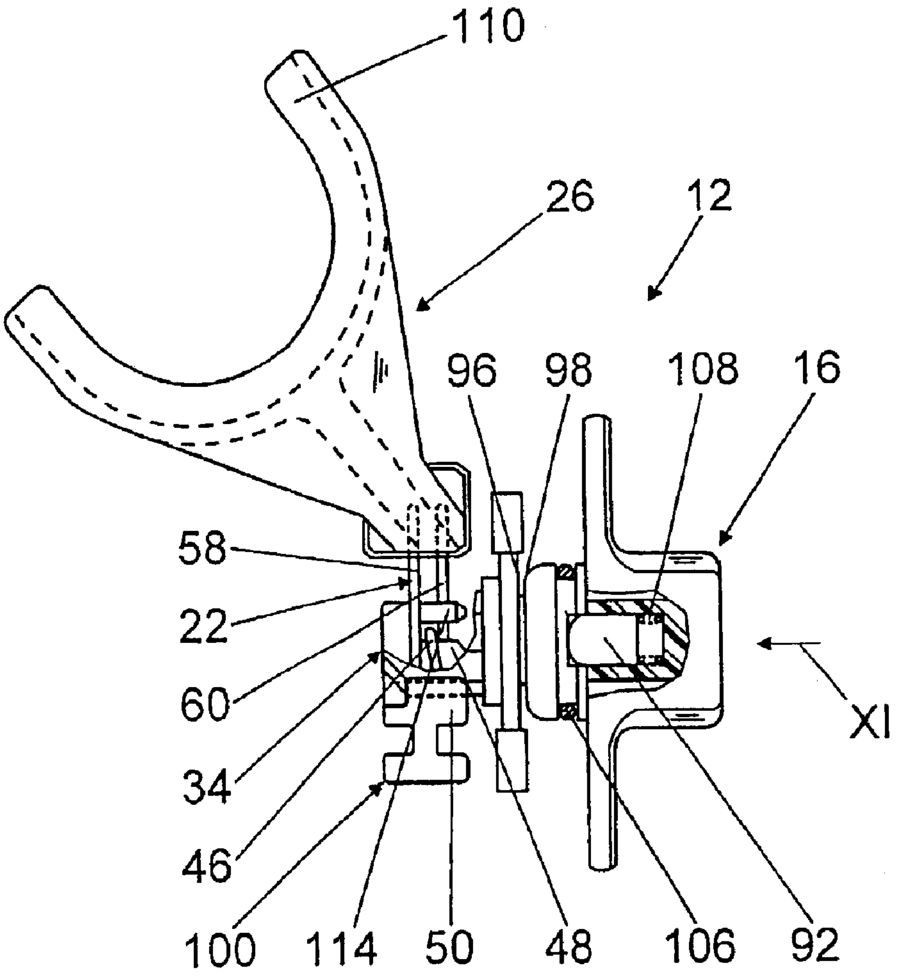
FIG. 10 shows a view in direction X in FIG. 9.
Figure 11:
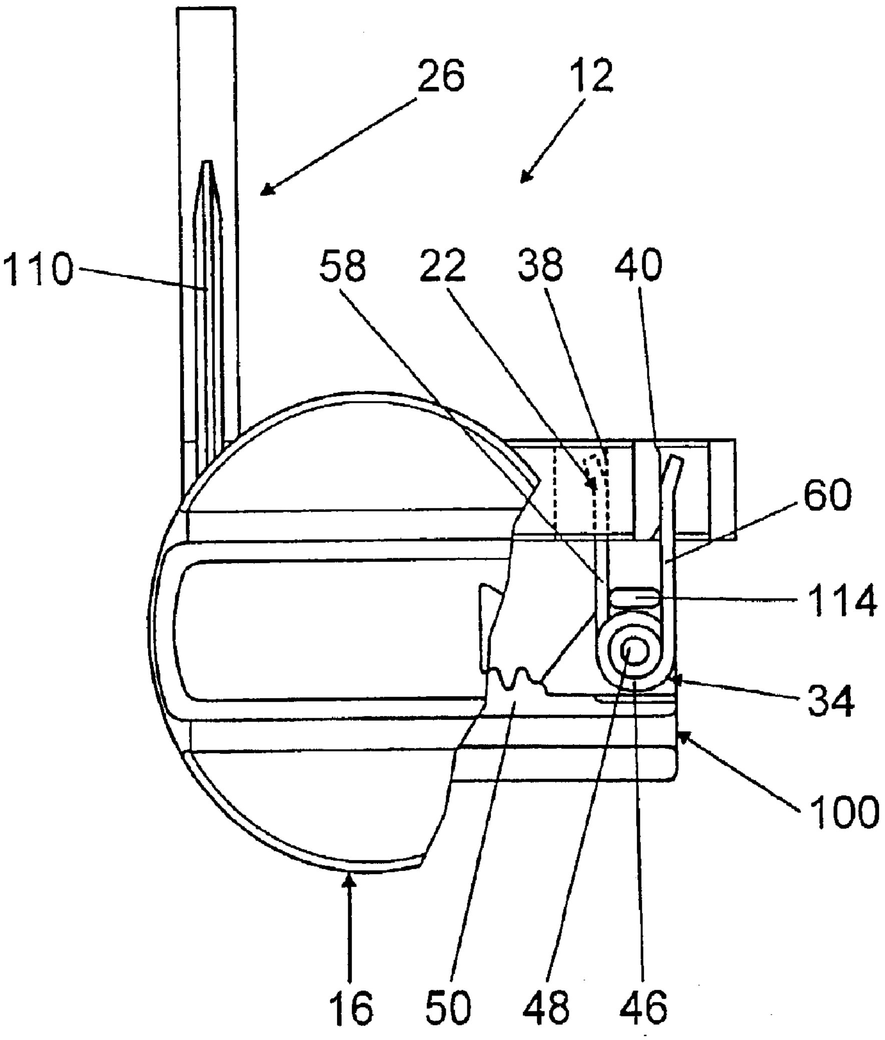
FIG. 11 shows a view in direction XI in FIG. 10.

FIGS. 9, 10 and 11 show cut-away portions of an exemplary embodiment. In general, essentially constant components are specified by the same reference numerals. Moreover, reference may be made to the description for the exemplary embodiment in FIGS. 1 through 8 with respect to features and functions that remain the same.

Indexing mechanism 12 includes a plastic actuating element 16, formed as a rotary knob, on which a gear wheel 84 is integrally molded. Gear wheel 84 meshes with a gear rack 50, on which a component 34 is premolded in one piece and is shiftable by actuating element 16 via gear wheel 84 and gear rack 50 axially in actuating directions 28, 30.

Component 34 is connected to a shift fork 26 via a spring-steel spring element 22, formed as a torsion spring, in the flux of force from actuating element 16 to a coupling (not shown). Actuating element 16 is secured to a housing part (not shown) by a retaining ring 96 which engages with a turned recess 98 of actuating element 16 (FIG. 10). Actuating element 16 is sealed with respect to the housing part by a sealing ring 106. Shift fork 26 is retained on the housing part by retaining elements (not shown) which engage with an H-profile 100 of component 34.

Spring element 22 is supported on a form-locking element 48, formed as a pin, of component 34 by an integrally molded form-locking element 46 formed as a spiral. Moreover, spring element 22, using a first limb 58, engages with form locking with a form-locking element 38, formed as a projection integrally molded onto shift fork 26, in actuating direction 28, and using a second limb 60, engages with form locking with a form-locking element 40, formed as a projection integrally molded onto shift fork 26, in actuating direction 30.

One limb 60 of spring element 22 is arranged in the axial direction of actuating element 16 in front of shift fork 26, and one limb 58 is disposed behind shift fork 26 (FIG. 11). Gear wheel 84 is disposed between gear rack 50 and shift fork 26, which means, in spite of an overall low unit volume, spring element 22 is implemented with long limbs 58, 60, and a large, deformable spring volume may be attained.

Spring element 22 may be braced in both actuating directions 28, 30, and an indexing position may be preselected in both actuating directions 28, 30, according to the exemplary embodiment in FIGS. 1 through 8. To prevent spring element 22 from rotating on the pin during a preselection operation, premolded onto component 34 is a bar 114 which extends in the axial direction of the pin between limbs 58, 60 of spring element 22. Moreover, spring element 22 may simply be mounted pre-stressed. In this context, bar 114 prevents limbs 58, 60 from crossing.

To prevent actuating element 16 from being able to rotate beyond its indexing positions, premolded on actuating element 16 is a bolt 102 which is guided in a groove (not shown), extending over approximately 180°, in the housing part, strikes against the end of the groove in the indexing positions, and limits actuating element 16 in its rotary motion. In the indexing positions, actuating element 16 is fixed in position by a detent pin 92 which is movable against a compression spring 108 during the switching (FIG. 10).

What is claimed is:

1. A machine tool comprising:

at least one coupling element;

an actuating element;

an indexing mechanism that is switchable by the actuating element to move the at least one coupling element;

a first component;

a second component connected to a gear rack;

at least one spring element that is arranged in a flux of force between the actuating element and the at least one coupling element, and that is elastically deformable in two actuating directions, wherein the spring element in the flux of force from the actuating element in the direction of the at least one coupling element is fixedly connected to the first component in at least two actuating directions, and in an opposite direction of the flux of force is fixedly connected to the second component at least in the two actuating directions.

2. The machine tool of claim 1, wherein the machine tool includes a hand machine tool.

3. The machine tool of claim 1, wherein the spring element and at least one of the first component and the second component are formed by separate components.

4. The machine tool of claim 3, wherein the first component and the at least one spring element are interconnected via at least one integrally molded form-locking element in at least the two actuating directions.

5. The machine tool of claim 3, wherein the second component and the at least one spring element are interconnected via at least one integrally molded form-locking element in at least the two actuating directions.

6. The machine tool of claim 1, wherein the first component is formed by a shift fork.

7. The machine tool of claim 1, wherein the second component is configured in one piece with the gear rack.

8. The machine tool of claim 7, wherein the gear rack and the actuating element are interconnected via at least one integrally molded form-locking element.

9. The machine tool of claim 8, wherein the gear rack is secured by the actuating element which is secured by the gear rack to a housing part.

10. The machine tool of claim 1, wherein the at least one spring element is formed by a torsion bar.

11. The machine tool of claim 1, wherein the at least one spring element is formed by a torsion spring.

12. The machine tools of claim 11, wherein the torsion spring engages via two limbs with the first component and is supported on the second component on a form-locking element formed as a pin.

* * * * *